US011801941B2

(12) United States Patent
Ruiz et al.

(10) Patent No.: US 11,801,941 B2
(45) Date of Patent: Oct. 31, 2023

(54) SUITE WITH IMPROVED ARRANGEMENT, IN PARTICULAR FOR AN AIRCRAFT CABIN

(71) Applicants: Safran Seats, Plaisir (FR); Safran Seats GB Limited, Wales (GB)

(72) Inventors: Oscar Ruiz, Moissy-Cramayel (FR); Arthur Glain, Moissy-Cramayel (FR); Yann Cavereau, Moissy-Cramayel (FR); Paul Wills, Moissy-Cramayel (FR); Rachel James, Moissy-Cramayel (FR); James Woodington, Moissy-Cramayel (FR); Shaun Kilbane, Moissy-Cramayel (FR); Ryan Jones, Moissy-Cramayel (FR)

(73) Assignees: Safran Seats, Plaisir (FR); Safran Seats GB Limited, Cwmbran (GB)

( * ) Notice: Subject to any disclaimer, the term of this patent is extended or adjusted under 35 U.S.C. 154(b) by 0 days.

(21) Appl. No.: 18/015,529

(22) PCT Filed: Jul. 8, 2021

(86) PCT No.: PCT/EP2021/069059
§ 371 (c)(1),
(2) Date: Jan. 10, 2023

(87) PCT Pub. No.: WO2022/017822
PCT Pub. Date: Jan. 27, 2022

(65) Prior Publication Data
US 2023/0257121 A1   Aug. 17, 2023

(30) Foreign Application Priority Data

Jul. 24, 2020 (FR) ..................................... 2007795

(51) Int. Cl.
*B64D 11/06* (2006.01)

(52) U.S. Cl.
CPC ...... *B64D 11/0605* (2014.12); *B64D 11/0604* (2014.12)

(58) Field of Classification Search
CPC ........................ B64D 11/0604; B64D 11/0605
See application file for complete search history.

(56) References Cited

U.S. PATENT DOCUMENTS

| 5,954,401 A | * | 9/1999 | Koch | B60N 2/242 |
| | | | | 297/184.14 |
| 2010/0065683 A1 | * | 3/2010 | Darbyshire | B64D 11/0604 |
| | | | | 244/118.6 |

(Continued)

FOREIGN PATENT DOCUMENTS

WO      2008122762 A1    10/2008

OTHER PUBLICATIONS

International Patent Application No. PCT/EP2021/069059, Written Opinion, dated Sep. 24, 2021.

(Continued)

*Primary Examiner* — Tye William Abell
(74) *Attorney, Agent, or Firm* — Kilpatrick Townsend & Stockton LLP

(57) ABSTRACT

The present invention relates to a suite, in particular for an aircraft cabin, comprising:
a seat,
an ottoman, and
a storage cupboard,
the suite further comprising a movable table capable of assuming:
a stowed state in
which the movable table extends in a vertical plane, in which the movable table is arranged between the cupboard and the ottoman, and (Continued)

a deployed state in which the movable table extends in a horizontal plane.

13 Claims, 4 Drawing Sheets

(56) References Cited

U.S. PATENT DOCUMENTS

| | | | | |
|---|---|---|---|---|
| 2011/0210205 A1* | 9/2011 | Bock | ............... | B64D 11/0636 |
| | | | | 244/118.6 |
| 2012/0133180 A1* | 5/2012 | Moulton | ............ | B64D 11/0605 |
| | | | | 297/135 |
| 2018/0281964 A1* | 10/2018 | Carlioz | .............. | B64D 11/0601 |

OTHER PUBLICATIONS

International Patent Application No. PCT/EP2021/069059, International Search Report (and translation) and Written Opinion, dated Sep. 24, 2021.

* cited by examiner

[Fig 1]
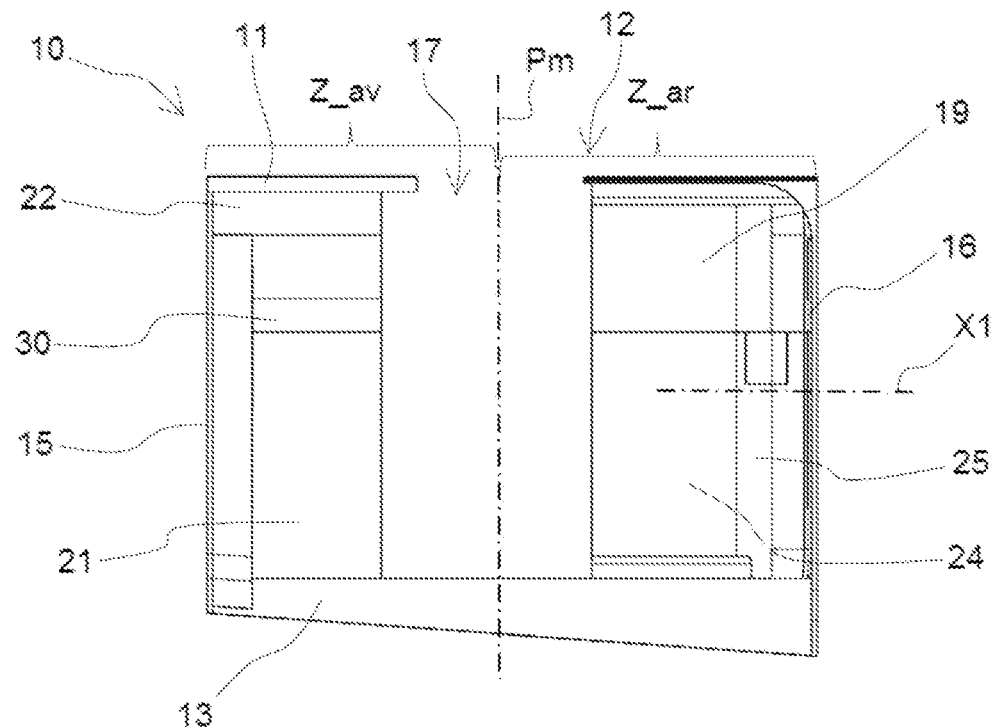
[Fig 2]
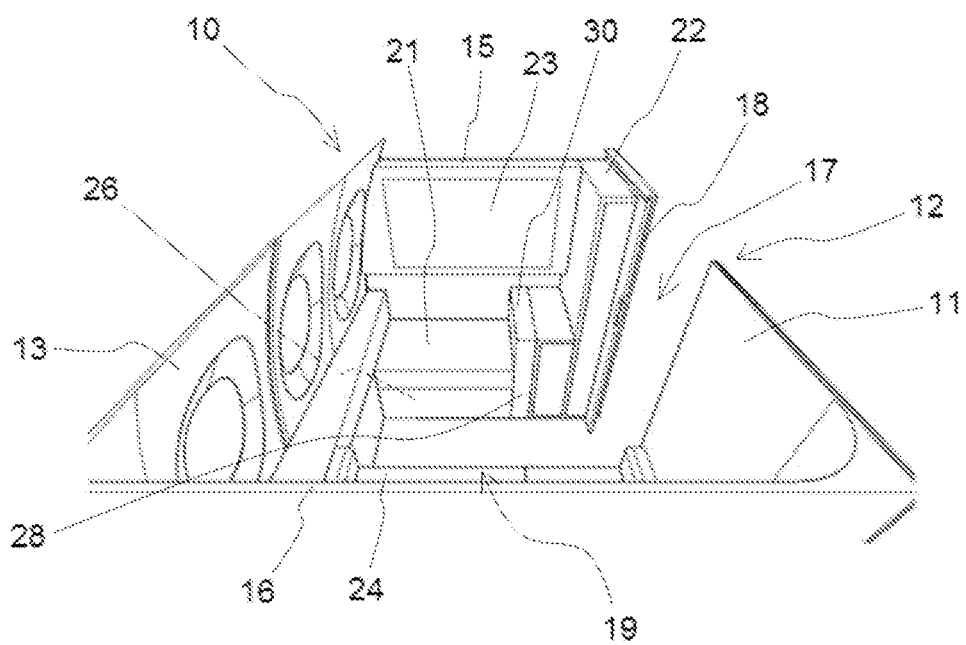

[Fig.3]
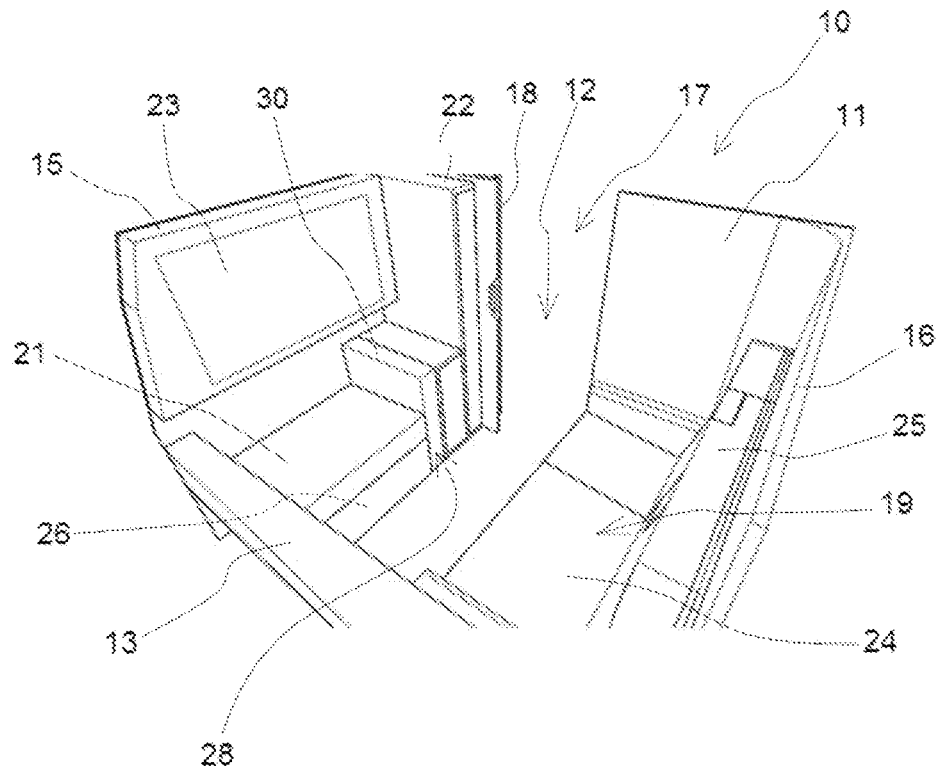
[Fig 4]
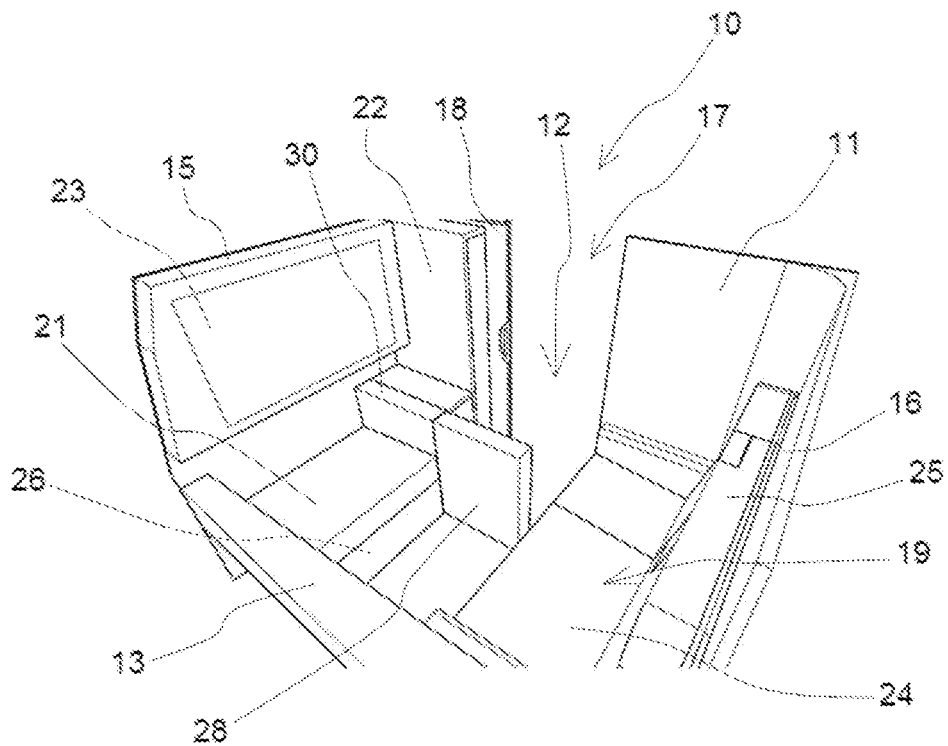

[Fig 5]
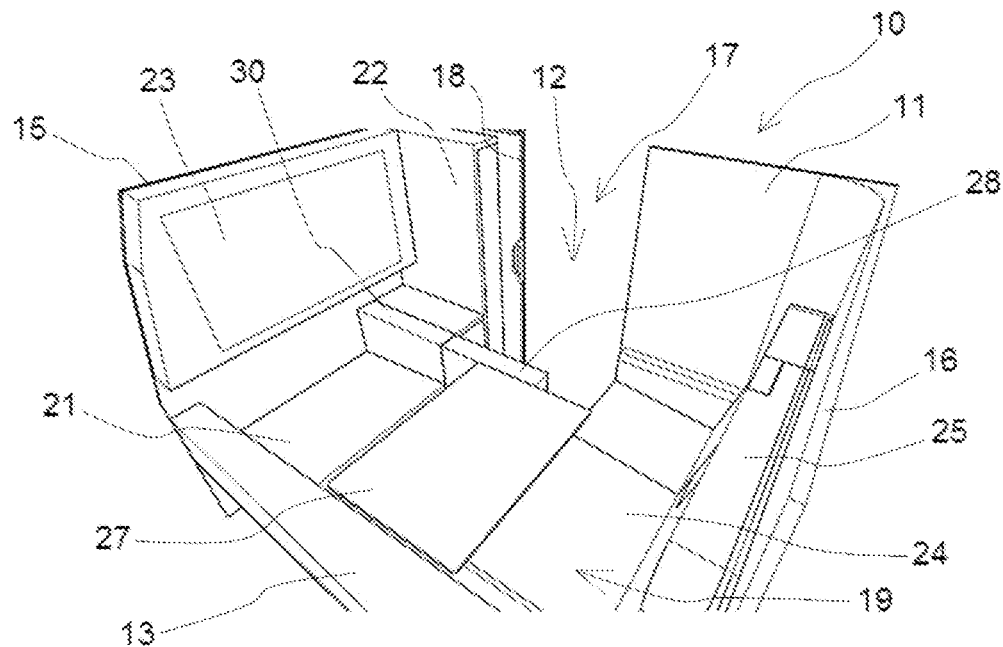
[Fig 6]
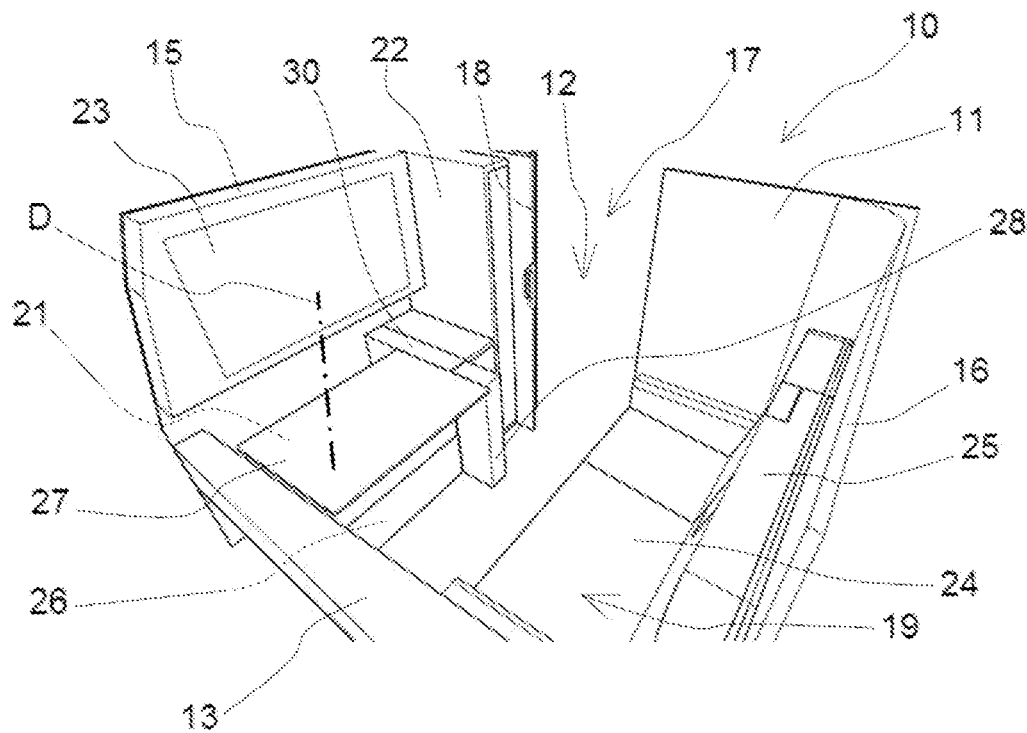

[Fig 7]
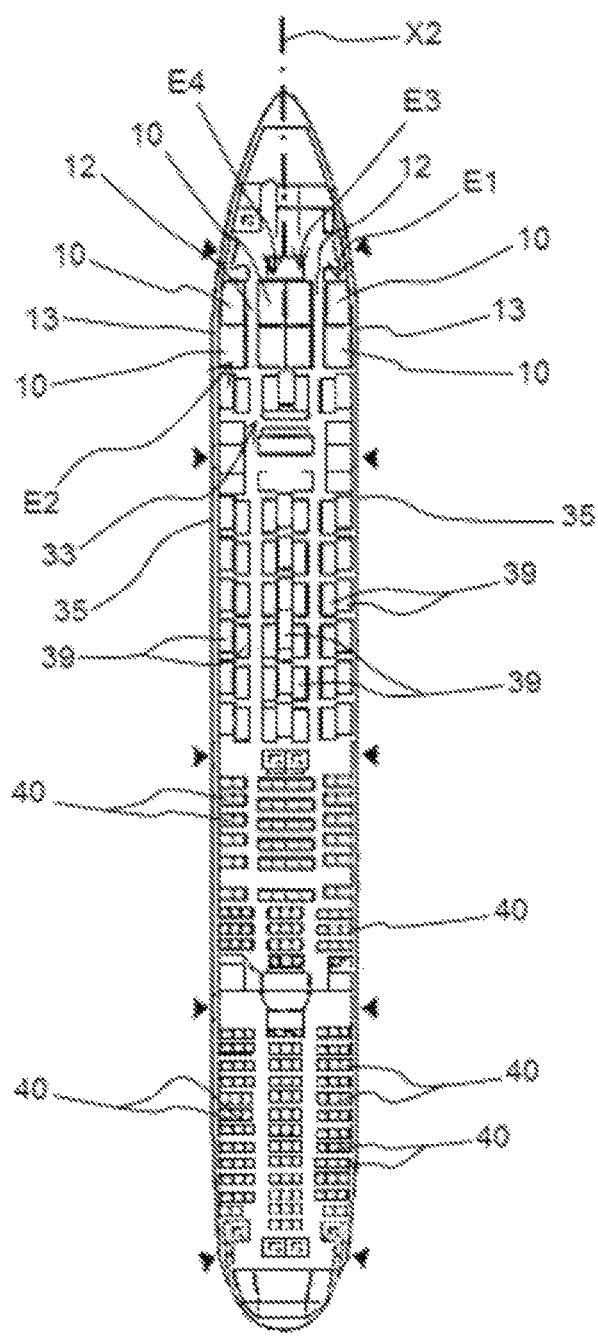

SUITE WITH IMPROVED ARRANGEMENT, IN PARTICULAR FOR AN AIRCRAFT CABIN

CROSS REFERENCE TO RELATED APPLICATIONS

This application is a national phase application of International Patent Application PCT/EP2021/069059 ("the '059 application"), filed on Jul. 8, 2021 and titled "SUITE WITH IMPROVED ARRANGEMENT, IN PARTICULAR FOR AN AIRCRAFT CABIN," which application is related to and claims priority benefits of France Patent Application No. 2007795 ("the '795 application"), filed on Jul. 24, 2020. The '059 and '795 applications are hereby incorporated in their entireties by this reference.

The present invention relates to a suite with an improved arrangement, in particular for an aircraft cabin. According to the invention, a suite is defined by an enclosed or semi-enclosed space in which are arranged at least one seat and an arrangement of furniture near the seat, such as a table, an ottoman, or any other element necessary for the arrangement of the suite.

The invention finds a particularly advantageous, but not exclusive, application for "first class" type cabins as well as potentially for "business class" type cabins.

The "business class" and "first class" type suites includes seats offering passengers different positions of comfort, from a "seating" position to a "reclining" position, in which the seat defines a lying surface substantially horizontal so that the passenger can lie down.

Current design trends call for arrangements similar to those of hotel rooms, such as minibars, wardrobes, as well as increasing the width of first class suites in particular in order to maximize bed space. As a result, new furniture layouts around the seat have been developed to meet these needs.

One thus knows a suite comprising a seat associated with two armrests and a large ottoman in front of the seat. The seat is adapted to move into a reclining position in which the bed surface extends perpendicular to the direction of the seat and table assembly. A folding table is stored inside an armrest. However, placing the table next to the seat has the disadvantage of reducing the width of the seat. Furthermore, the fact that the bed unfolds perpendicular to the assembly formed by the seat and the table implies that the table cannot be used in the intermediate positions of the seat between the seated position and the lying position.

Another known arrangement is to integrate a table between an ottoman and a main seat. The table is stored inside the extern furniture. However, the storage volume around and behind a table movement kinematics does not allow to increase the width of the seat in its upper part.

The invention aims to remedy the aforementioned drawbacks by proposing an improved suite arrangement which notably meets the space and comfort requirements of airlines.

More specifically, the subject of the invention is a suite, in particular for an aircraft cabin, comprising:
  a seat,
  an ottoman, and
  a storage cabinet,
  said suite further comprises a mobile table able to take up:
    a stowed state in which said movable table extends in a vertical plane, said movable table then being disposed between the cabinet and the ottoman, and
    a deployed state in which said movable table extends in a horizontal plane.

The invention thus makes it possible, thanks to such an arrangement of furniture inside the suite, to improve passenger comfort by using the entire width of the suite for the seat. This provides a maximum width of the seat area which is not impacted by the presence of the storage cabinet or the table. The configuration according to the invention also allows the suite to be easily adapted to the reduced width profile of the side walls that are generally at the front of certain aircraft, and this without affecting the size of the table or the storage cabinet. The invention also makes it possible to maximize the filling density of the cabin while optimizing the living space for the passenger. The invention therefore provides a competitive advantage over current first-class suites.

According to one embodiment of the invention, the table is mounted on a carriage movable in translation between a stored position in which the carriage is arranged with the table between the ottoman and the storage cabinet and a deployed position in which the carriage is closer to the seat.

According to one embodiment of the invention, the table can move to the deployed state from the carriage when said carriage is in the deployed position.

According to one embodiment of the invention, the table in the deployed state can move in a direction parallel to an axis of the seat.

According to one embodiment of the invention, the table in the deployed state can move between a first extreme position in which the table is close to the seat and a second extreme position in which the table is away from the seat.

According to one embodiment of the invention, in the second extreme position, the mobile table is vertically superposed at least partially with the ottoman.

According to one embodiment of the invention, the table in the deployed state can take up an intermediate position in which the table is between the ottoman and the seat.

According to one embodiment of the invention, a width of the table is substantially equal to a width of the seat.

According to one embodiment of the invention, the table comprises a single flap.

According to one embodiment of the invention, the table comprises two hinged flaps relative to each other.

According to one embodiment of the invention, the carriage is placed inside a storage box when the carriage is in the stored position.

According to one embodiment of the invention, the storage box is fixed so as to avoid the generation of an empty space due to a movement of the carriage.

According to one embodiment of the invention, a storage space is provided under the ottoman.

According to one embodiment of the invention, the ottoman is hinged so as to allow access to the storage space.

According to one embodiment of the invention, the storage cabinet extends over the entire height of the suite.

The invention will be better understood and other characteristics and advantages will appear by reading the following detailed description, which includes embodiments given for illustrative purposes with reference to the accompanying figures, presented as way of non-limiting examples, which may serve to complete the understanding of the present invention and the description of its implementation and eventually contribute to its definition, wherein:

FIG. 1 is a top view of a suite according to the present invention;

FIGS. 2 and 3 are perspective views of a suite according to the present invention from two different viewing angles;

FIG. 4 is a perspective view of a suite according to the invention illustrating the carriage in the deployed position;

FIG. 5 is a perspective view of a suite according to the invention illustrating the table in the deployed state;

FIG. 6 is a perspective view of a suite according to the invention illustrating the table in the deployed state and pushed back to the ottoman to allow the exit of the passenger to the aisle;

FIG. 7 is a schematic representation of an arrangement of seats in an airplane cabin comprising suites according to the invention in the front part.

It should be noted that, in the figures, the structural and/or functional elements common to the different embodiments may have the same references. Thus, unless otherwise stated, such elements have identical structural, dimensional and material properties.

In the rest of the document, the relative terms such as "front" and "rear" are understood by reference to the meaning that a passenger in the seat of the suite according to the invention would give them.

FIGS. 1, 2 and 3 show a suite 10 for an aircraft cabin, said suite being delimited by a first side wall 11 on the side of a circulation aisle 12, a second side wall 13 formed by a portion of a wall of the fuselage or by a partition wall between two adjacent suites 10, a front end wall 15, and a rear end wall 16. An access passage 17 is provided in the side wall 11 on the aisle side. If necessary, a removable door 18 may be provided for closing this access passage 17. In FIGS. 2 and 3, the door 18 is shown in the open position.

A front zone Z_Av of the suite 10 is defined, which extends between a median plane Pm of the suite 10, which plane is perpendicular to the side walls 11, 13, and the front end wall 15, as shown in FIG. 1. A rear zone Z_ar of the suite 10 extends between the median plane Pm and the rear end wall 16.

The suite 10 includes a seat 19 in the rear area Z_ar near the rear end wall 16. An ottoman 21 and a storage cabinet 22 are arranged in the front area Z_av near the front end wall 15. By moving the furniture elements 21, 22 away from the zone for the seat 19, it is thus possible to install a seat 19 occupying the entire width of the suite 10. The living space for the passenger is thus improved.

The suite 10 may be provided with an IFE (In-Flight Entertainment) system comprising in particular a video screen 23 carried by the front end wall 15.

More specifically, the seat 19 comprises a seating part 24 and a backrest 25 which may, if necessary, be made of two parts hinged to one another. The seat 19 has an axis X1, which is a horizontal axis passing through a median plane of the seat 24 and the backrest 25 of the seat 19. The seat 19 has a width which is greater than a width of a conventional seat, so that it allows a passenger to sit in different orientations. For example, the passenger can seat so as to have his/her body oriented in a direction which is substantially parallel to the axis X1 of the seat 19, or so as to have his/her body oriented with a non-zero angle up to 90 degrees relative to the axis X1 of the seat 19.

A seat 19 can be convertible, via an adapted kinematics, between a "seating" position, corresponding to the position notably used during the stopping, take-off and landing phases of the aircraft, and an "lying" position, in which the seat 24 moves forward and the backrest 25 tilts substantially horizontally so that the seat 24, the backrest 25, and the ottoman 21 form a bed surface for the passenger.

The ottoman 21 is of the open type as opposed to the ottomans placed inside a foot housing. In addition to its primary function of receiving a passenger's feet, the ottoman 21 can be used by a second passenger as a seat 19. Preferably, a storage space 26 visible in particular in FIG. 2 is placed under the ottoman 21. The ottoman 21 may be articulated, in particular about an axis of rotation, to allow access to the storage space 26.

Preferably, the ottoman 21 is placed on the closest side to the portion of the wall of the fuselage 13 while the cabinet 22 is placed on the closest side to the aisle 12. Indeed, the curved shape of the wall of the fuselage has a minimal impact on the ottoman 21 which has a reduced bulk. In addition, any interference between the cabinet 22 and the wall of the curved fuselage is avoided. The cabinet 22 can thus extend over the entire height of the suite 10. The cabinet 22 has a large storage space allowing the storage of long clothes. The cabinet 22 is accessible from the interior of the suite 10.

Furthermore, by placing the elements, such as the cabinet 22, which could impede the circulation of air, away from the fuselage wall and by placing the ottoman 21, which allows better air circulation, near the wall of the cabin fuselage, it is possible to meet the decompression constraints of certain aircraft, such as the Airbus A350 (registered trademark) or similar.

In addition, a movable table 27 can take up a stowed state and an unfolded state. In the stowed state, the table 27 extends in a vertical plane. The table 27 is then placed between the cabinet 22 and the ottoman 21. In the deployed state, the table 27 extends in a horizontal plane. Other elements, such as a minibar, or a storage unit, can be placed between the cabinet 22 and the ottoman 21.

The table 27 can thus be placed next to the ottoman 21 in a storage area, the table 27 has no impact on the width of the seat 19. It is also possible to use a table 27 of large width whose dimensions do not have a significant impact on the surrounding elements or on the circulation of air. On the other hand, if the table 27 were placed close to the wall of the fuselage in the stored state, the height of the table 27 could become a constraint, insofar as it could obstruct a window and/or the circulation of the air.

The table 27 is mounted on a carriage 28 movable in translation between a stored position in which the carriage 28 is placed with the table 27 between the ottoman 21 and the cabinet 22 (original location) and a deployed position in which the Carriage 28 is moved closer to the seat 19, as shown in FIG. 4. To pass from the stored position to the deployed position, the carriage 28 can thus be moved in translation backwards in the direction of the seat 19. The table 27 can passing to the deployed state from the carriage 28 when said carriage 28 is in the deployed position.

Preferably, the table 27 in the deployed state is movable in a direction parallel to the axis X1 of the seat 19. In this case, the table 27 in the deployed state is movable between a first extreme position in which the table 27 is close to the seat 19, as shown in FIG. 5, and a second extreme position in which the table 27 is placed in the front zone Z_av of the cabin so as to be away from the seat 19 and the passenger, as shown in FIG. 6. In the second extreme position, the table 27 may be vertically superimposed at least partially with the ottoman 21. "Vertically superimposed at least partially" means that there is at least one vertical line D intersecting both the table 27 and the ottoman 21.

The table 27 in the deployed state can thus be pushed towards the front of the cabin by the passenger in order to clear the central space of the suite 10. The passenger can then leave the suite 10 without having to remove the objects placed on the table 27.

The table 27 in the deployed state can also take up an intermediate position in which the table 27 is placed between the ottoman 21 and the seat 19. The passenger in the suite 10 can thus take a meal, or exchange documents with a second person sitting on the ottoman 21 and facing him/her.

Advantageously, the width of the table 27 is substantially equal to a width of the seat 19. By "substantially equal" it is meant that there may be a variation in width of about 20% between these two elements. In the example shown, the table 27 has a single flap. As a variant, the table 27 comprises two hinged flaps relative to each other.

As can be seen in FIGS. 2, 3, and 4, the carriage 28 is placed within a storage box 30 when the carriage 28 is in the stored position. The storage box 30 has a parallelepipedic shape. The storage box 30, open towards the seat 19, is placed between the cabinet 22 and the ottoman 21. The storage box 30 remains fixed when the passenger slides the carriage 28 backwards and when the table 27 is deployed.

Relative to the stored position, the carriage 28 moves away over a distance comprised between 15 inches (38.1 cm) and 25 inches (63.5 cm), in particular a distance of about 20 inches (50.8 cm), to reach the deployed position in which the table 27 is close enough to the passenger to be used.

The fixed box 30 makes it possible to avoid the generation of an empty space due to a movement of the carriage 28 in which objects could get stuck and then prevent the carriage 28 and the table 27 from returning to the stored position. The storage box 30 also provides a top surface suitable for supporting small objects.

The operation of the device according to the invention is described below. The carriage 28 and the table 27 in the stowed state are by default housed in the storage box 30, as shown in FIG. 3. The passenger sits down on the seat 19 and pulls the assembly carriage 28-table 27 backwards towards the seat 19, so as to pass the carriage 28 from the stored position to the deployed position, as shown in FIG. 4. The passenger can then pass the table 27 to the deployed state so that the table 27 extends in a horizontal plane, as shown in FIG. 5. He/She can then pull the table 27 towards him/her in order to use it during a meal or a work session.

In the event that the passenger wishes to leave the suite 10, the passenger can push the table 27 in the deployed state towards the ottoman 21 (cf. FIG. 6) in order to clear the central space of the suite 10 and reach without difficulty the aisle 12.

In the case when the passenger receives a visitor, the latter can sit on the ottoman 21, while the table 27 can be place in an intermediate position. The passenger and the visitor will thus be able to share a meal or documents face to face on the table 27 between them.

As shown in FIG. 7, the invention is preferably implemented with an aircraft cabin 33 provided with two aisles 12.

The suites 10 can be installed in the front part of the aircraft cabin 33, the width of which decreases towards the nose of the aircraft.

According to an exemplary embodiment, a first set E1 and a second set E2 of two suites 10 are placed symmetrically with respect to a longitudinal axis X2 of the aircraft. The first set E1 of two suites 10 is place on the starboard side along a portion 13 of the wall of the fuselage 35. The second set of two suites 10 is placed on the port side along a portion 13 of the wall of the fuselage 35.

In addition, a third set E3 of two suites 10 and a fourth set E4 of two suites 10 are placed in the central part of the aircraft cabin 33. The third set E3 and the fourth set E4 are separated from each other by a partition wall 13.

The sets of suites E1 and E3 are separated from each other by a first aisle 12. The sets of suites E2 and E4 are separated from each other by a second aisle 12.

Of course, the number of suites 10 placed can be adapted according to the space available in the aircraft cabin 33.

Seat units 39 of the "business class" type can be placed in the intermediate part of the aircraft cabin 33. Seats 40 of the economy class type can be placed in the rear part of the aircraft cabin 33.

As a variant, the suites 10 according to the invention could be placed in an aircraft cabin with a single aisle.

Of course, the different features, variants and/or embodiments of the present invention can be associated with each other in various combinations insofar as they are not incompatible with or exclusive of each other.

Furthermore, the invention is not limited to the embodiments described above and provided solely by way of example. It encompasses various modifications, alternative forms and other variants that a person skilled in the art may consider in the context of the present invention and in particular any combination of the various modes of operation described previously, which may be considered separately or in combination.

The invention claimed is:

1. A suite in particular for an aircraft cabin, comprising:
   a seat,
   an ottoman, and
   a storage cabinet, characterized in that said suite further comprises a movable table able to take up:
   a stowed state in which said movable table extends in a vertical plane, said movable table then being placed between the cabinet and the ottoman, and
   a deployed state in which said movable table extends in a horizontal plane,
   the movable table being mounted on a carriage movable in translation between a stored position in which the carriage is placed with the movable table between the ottoman and the storage cabinet and a deployed position in which the carriage is a minimum distance from the seat,
   the carriage being placed inside a storage box when the carriage is in the stored position,
   the storage box placed between the cabinet and the ottoman being open towards the seat, so that the carriage can be pulled rearward towards the seat, so as to move the carriage from the stored position to the deployed position.

2. The suite according to claim 1, wherein the movable table can pass to the deployed state from the carriage when the said carriage is in the deployed position.

3. The suite according to claim 1, wherein the movable table in the deployed state is movable in a direction parallel to an axis of the seat.

4. The suite according to any claim 1, wherein the movable table in the deployed state can take up an intermediate position in which the movable table is placed between the ottoman and the seat.

5. The suite according to any claim 1, wherein a width of the movable table is substantially equal to a width of the seat.

6. The suite according to any claim 1, wherein the movable table comprises a single flap.

7. The suite according to claim 1, wherein the movable table comprises two flaps hinged to one another.

8. The suite according to claim 1, wherein the storage box is fixed so as to avoid the generation of an empty space due to a movement of the carriage.

9. The suite according to claim 1, wherein the storage cabinet extends over the entire height of said suite.

10. The suite according to claim 1, wherein the movable table in the deployed state is movable between a first position in which the movable table is a minimum distance from the seat and a second position in which the movable table is placed a distance away from the seat.

11. The suite according to claim 10, wherein in the second position the movable table is vertically superimposed at least partially with the ottoman.

12. The suite according to claim 1, wherein a storage space is placed under the ottoman.

13. The suite according to claim 12, wherein the ottoman is hinged to allow access to the storage space.

* * * * *